United States Patent [19]
Bratten

[11] Patent Number: 5,209,841
[45] Date of Patent: May 11, 1993

[54] FILTER BELT ARRANGEMENT FOR PRESSURIZED CHAMBER FILTER

[76] Inventor: Jack R. Bratten, 5970 St. James Dr., West Bloomfield, Mich. 48322

[21] Appl. No.: 766,182

[22] Filed: Sep. 27, 1991

[51] Int. Cl.$^5$ .................. B01D 29/09; B01D 29/64
[52] U.S. Cl. ............................ 210/107; 210/387; 210/396; 210/400
[58] Field of Search ......... 210/387, 400, 783, DIG. 3, 210/396, 401, 143, 107; 242/74

[56] References Cited

U.S. PATENT DOCUMENTS

| | | | |
|---|---|---|---|
| 1,757,241 | 5/1930 | Forse | 242/74 |
| 3,437,210 | 4/1969 | O'Neill | 210/387 |
| 4,430,231 | 2/1984 | Bratten | 210/400 |
| 4,568,460 | 2/1986 | Bratten | 210/387 |
| 4,944,870 | 7/1990 | Yagishita et al. | 210/387 |

FOREIGN PATENT DOCUMENTS 164482 12/1984 European Pat. Off. .
174907 8/1986 Japan .

Primary Examiner—Matthew O. Savage
Attorney, Agent, or Firm—John R. Benefiel

[57] ABSTRACT

A liquid filter and method is disclosed comprised of a housing defining a filter chamber, with a filter belt advanced into the filter chamber and receiving liquid flow to filter the liquid. Different sections of the filter belt are alternately positioned in the filter chamber by a pair of drive-take up rollers each positioned on one side of an entrance opening to the filter chamber, which are driven in opposite directions after alternate cycles. Each section of the filter belt is scraped when exiting and subsequently cleaned with washing sprays as the particular section is advanced back into the filter chamber. The filter belt is detachably attached at either end to a respective roller by a sewn in flexible element received an undercut groove in the roller surface.

9 Claims, 4 Drawing Sheets 5,209,841

FILTER BELT ARRANGEMENT FOR PRESSURIZED CHAMBER FILTER

BACKGROUND OF THE INVENTION

This invention concerns filters of a type including a movable filter belt disposed within a pressurized filter chamber during filtration of a liquid in the chamber, the filter belt advanced out of the chamber after a filter cycle to enable removal of the solids or cake accumulating on the top of the belt over the course of the cycle.

The present inventor has heretofore been granted U.S. Pat. Nos. 4,430,231 and 4,568,460 on this type of filter, featuring a filter housing of fixed construction having elongated openings at either end accommodating the entrance and exit of the filter belt, with inflatable hose seals used to establish a seal able to withstand the relatively high pressure existing in the filter chamber during a filter cycle.

Prior filters of this type were constructed with separable housing sections which were clamped against the filter on four sides to establish sealing of the filter chamber.

In the patented filter, the side edges of the filter belt had to be sealed to prevent bypass flow around the lateral edges of the belt during filtering. The filter belt rests on a perforated plate having solid side borders against which the filter belt was pressed by the chamber pressure, the filter belt having impervious edges to effect this result.

In the prior filters of this type the usual practice was to stack a number of filters vertically, and a continuous belt was circulated through the chamber of each filter in zig zag fashion, with a complex guidance and drive mechanism required, and significant down time involved in changing a belt.

Accordingly, U.S. Pat. No. 4,568,460 discloses and claims an independent belt arrangement for each filter unit, in which upper and lower segments of an endless belt overlie the perforated plate and liquid flow passes through both segments. The belt is advanced after each filter cycle to transport the accumulated solids out of the filter chamber for disposal preparatory to the next filter cycle.

This design is a simplified arrangement which represents a substantial advance over the prior single belt designs, but nonetheless has certain drawbacks.

Firstly, the belt design requires overlapping segments of different widths to achieve edge sealing, increasing the cost of the filter belt. The doubling of the filter belt layers increases the wearout rate, necessitating more frequent belt replacement.

The double overlapped edges also reduces slightly the width available for filtering action.

All of the endless filter belt designs require careful alignment and/or special devices to insure proper tracking of the filter belt over the support and drive rollers. Mistracking is aggravated when uneven loading of the belt occurs, as when solids accumulate more on one or the other side of the belt.

The cycle time is significantly extended in the endless belt arrangements by the need to readvance the same section of the filter belt back into position in the chamber after each movement of the belt out of the chamber at the end of the cycle.

SUMMARY OF THE INVENTION

The present invention comprises an improved filter belt arrangement for an inflated seal closed chamber belt filter of the type described in the above cited U.S. patents which does not involve an endless belt or doubled together filter belt segments, to simplify the filter belt alignment requirements and increase the filter belt life.

The filter belt arrangement according to the present invention involves a reversing belt drive which alternately shifts a plurality of separate sections of a fixed length of the filter belt either into a position in the housing filter chamber or in a partially wound up condition on a respective one of a pair of rollers. Each roller is located on an opposite side of the filter parallel to and aligned with a respective entrance opening to the filter chamber.

The rollers are alternatively driven and idled in reverse directions after alternate filter cycles so as to position either of the two separate sections of the belt over the support plate underlying the filter chamber.

A revolution counter associated with one or both of the rollers is advantageously employed to cause the appropriate filter belt sections to be accurately positioned in the filter housing at the beginning of each filter cycle.

The accumulated cake is scraped from the exiting filter belt segment as it is wound on its roller, with the housing seals inflated and the next cycle initiated as soon as the trailing belt section is in position to shorten the cycle time by eliminating the need to advance the same filter belt section back into the filter housing.

Washing jets are positioned to clean the upper and lower surfaces of the previously wound up belt section as it is again pulled back into the filter housing in the next filter cycle.

The sides of the belt are each provided with an impregnated edge, as of urethane plastic pressed into the belt fabric to create a durable, liquid impermeable lateral edges which will seal against the solid areas of the support plate when the filter chamber is pressurized.

The filter belt is attached at either end to a respective drive-takeup roller by a sewn-in elongated flexible key element received in a lengthwise undercut slot, allowing one step assembly of the belt to each roller, the flexible key element accommodating bending of the filter end to clear the side structure.

This arrangement avoids tracking problems by the reversing of the belt, since there is no cumulative mispositioning of the belt.

Since different sections of the belt are used, the life of the belt is multiplied, and elimination of the double layer reduces the rate of wear of the belt material.

The cycle time is reduced since a new section is advanced into the chamber simultaneously with withdrawal of the section used in the previous cycle.

DETAILED DESCRIPTION

Figure 1:
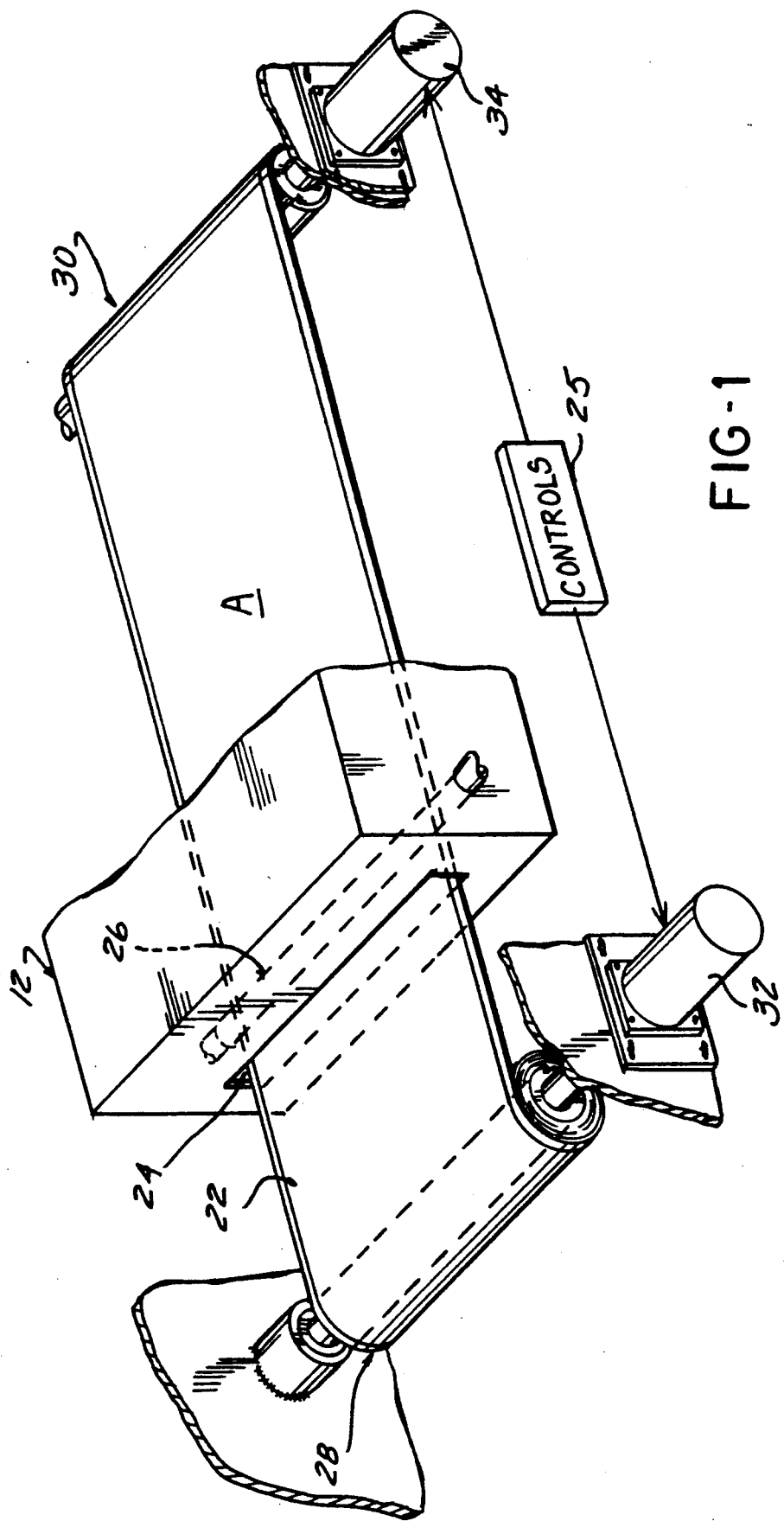
FIG. 1 is a perspective diagrammatic view of the filter unit and filter belt arrangement shown in FIG. 1.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the Figures, the present invention comprises filter belt arrangements for pressurized liquid filter units 10 of a type described in U.S. Pat. No. 4,430,231 and 4,568,460. Such filter units 10 will not be described herein in complete detail as they are so described in the aforementioned U.S. patents, but include a rigid filter housing 12 defining a filter chamber 14 adapted to receive a liquid to be filtered via inlet means 16.

A support plate 18 having a pattern of through openings separates the filter chamber 14 from a collection chamber 20 lying beneath the filter chamber 14. A filter belt 22 enters and exits the filter housing 12 via elongated openings 24 check IA at opposite ends of the filter housing 12, the elongate openings and support plate being substantially aligned in a common plane 100 (see FIG. 2). The filter belt 22 is of a woven construction creating minute filter openings, and overlies the support plate 18 so that liquid to be filtered passes through the filter belt 22 and thence through the openings in the support plate 18 to the collection chamber 20. Outlet mean 27 directs the filtered liquid to be returned to the system utilizing the liquid.

In order to seal off the filter chamber 14 during a filter cycle, an elongated inflatable seal 26 extends across each housing opening 24 and out through openings in the opposite sidewalls of the housing 12. The seals 26 are inflated upon command of the system controls 25 with a fluid so as to completely seal the filter chamber 14.

A suitable control system for operation of the basic filter is described in U.S. Pat. No. 4,861,494 issued on Aug. 29, 1989 for an "Automatic Cycle Control Arrangement and Method for a Pressure Filter". The filter may also include other components such as a dewatering diaphragm, not described here, but which is described in the U.S. patents referenced above.

The belt arrangement according to the present invention comprises a single layer filter belt 22 of a fixed length, and a first and second drive-take up roller 28, 30, each located parallel to and adjacent a respective housing opening 22 and being substantially adjacent to the common plane 100. The filter belt 22 is attached at either end to each roller 28, 30 so as to be able to be wound up alternately on one of the first and second rollers 28, 30.

The drive-take up rollers 28, 30 are adapted to alternatively be driven in opposite directions by drive means actuated by the control system 25.

Figure 2:
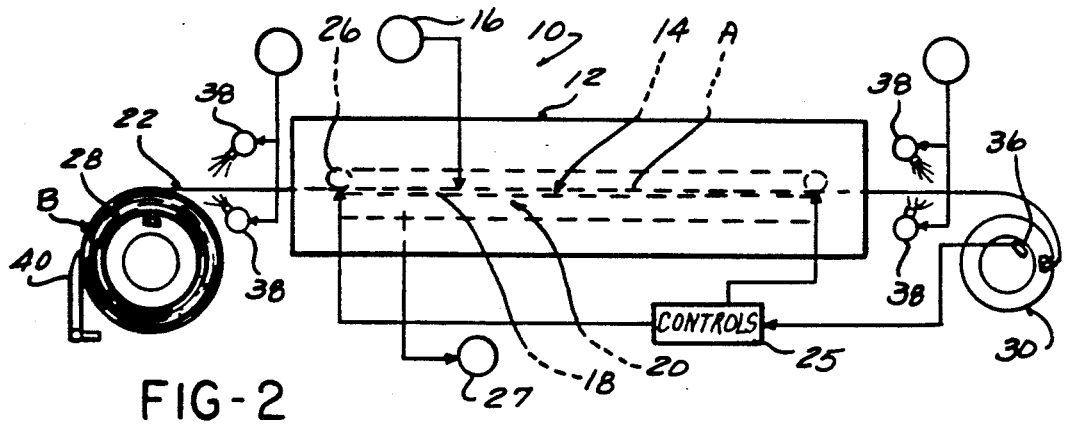
FIG. 2 is a diagram of a side view of a filter unit with a filter belt arrangement according to the present invention, showing a first filter belt section in position in the filter housing and a second section wound up on one of the drive takeup rollers.
Figure 3:
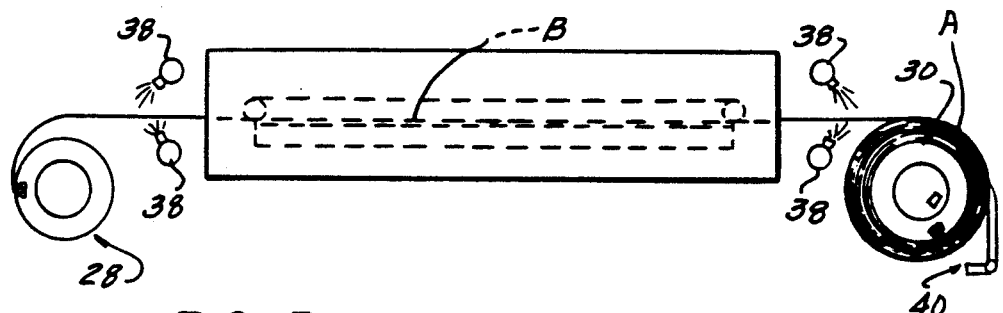
FIG. 3 is a diagram of the filter unit and filter belt arrangement shown in FIG. 2 with the second section in position in the filter housing and the other section wound up on the other drive take up roller.

The filter belt 22 is of a fixed length such that either of two separate sections A and B can alternatively be positioned in the filter chamber 14, while the other is wound on one of the rollers 28 or 30. This allows alternate use of a single belt by reversing the direction of movement of the filter belt 22 out of (or into) the filter chamber 14. The first roller 28 is driven so as to draw the filter belt 22 to the left, and wind up the filter belt 22 as shown in FIG. 2, disposing the section A in the filter chamber 14. After the cycle is completed, the roller 30 is driven so as to wind up the section A, disposing the unwound section B in the filter chamber 14, as indicated in FIG. 3.

A drive motor 32, 34 is associated with each drive-take up roller 28, 30, alternately activated by the system controls 25. A revolution counter 36 is associated with one of the rollers 30, which provides a signal to the system controls 28 to control the drive motors 32, 34 to enable sections A or B to be properly located in the housing 12 at the beginning of each filter cycle. The drive motors 32, 34 are preferably hydraulic motors which can be controllably retarded to enable controlled unwinding as the other motor is driven.

An array of washer jets 38 are disposed above and beneath the filter belt 22 at the point of exit from the housing openings 24. These jets 38 are directed away from the openings 24. The filter cake is scraped from the surface of the filter belt 22 as the section A or B is wound onto roller 28 or 30 by means of scraper bars 40. Washing occurs as the filter belt 22 is advanced back into the housing 12 preparatory to a new filter cycle.

Figure 4:
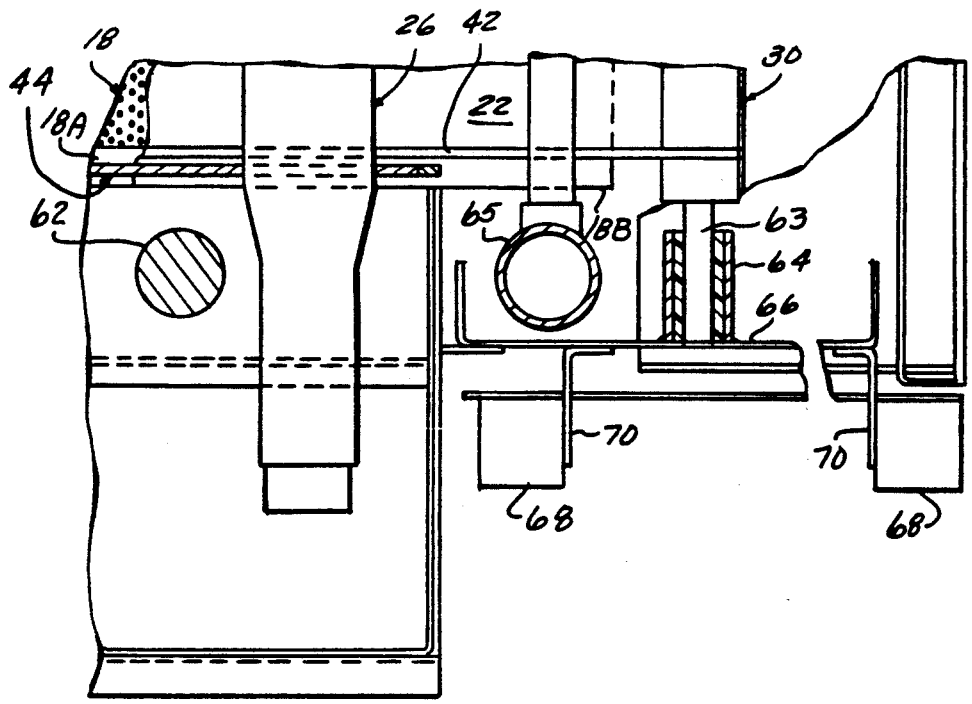
FIG. 4 is a fragmentary plan view in partial section of a corner of a filter unit and associated components of the filter belt arrangement.

FIG. 4 shows that the support plate 18 has a central region formed with a hole pattern that is bordered by a solid area 18A which exists along either side although only one side is shown in FIG. 4. These areas are overlain by an edge 42 of the filter belt 22 which is impregnated with a plastic such as urethane so as to be impervious to the flow of liquid. This treatment is preferably carried out by use of a hot press, forcing the urethane, into the fabric which has been brushed on in liquid form, which press also cures the urethane. This results in treated edges 42 which are not appreciably thicker than the filter belt itself and which cannot become loose, as can happen with adhesively bonded coatings.

Only a single layer of the filter belt 22 receives the liquid flow, as contrasted with the arrangement described in U.S. Pat. No. 4,568,460. . This single layer allows for better sealing and narrower border areas for sealing. However, a more open support plate 18 must be employed than in the prior design, since there is a reduced lateral flow through a single belt over that the in the double filter belt layer of the prior design. A 40% open area has been determined to be adequate, obtained by increasing the number of openings in the support plate 18.

The inflatable seals 26 pass through openings in side walls 44 welded to the support plate 18 and to a floor pan 46 defining the bottom of the collection chamber 20 of the next above filter unit 10B.

Figure 5:
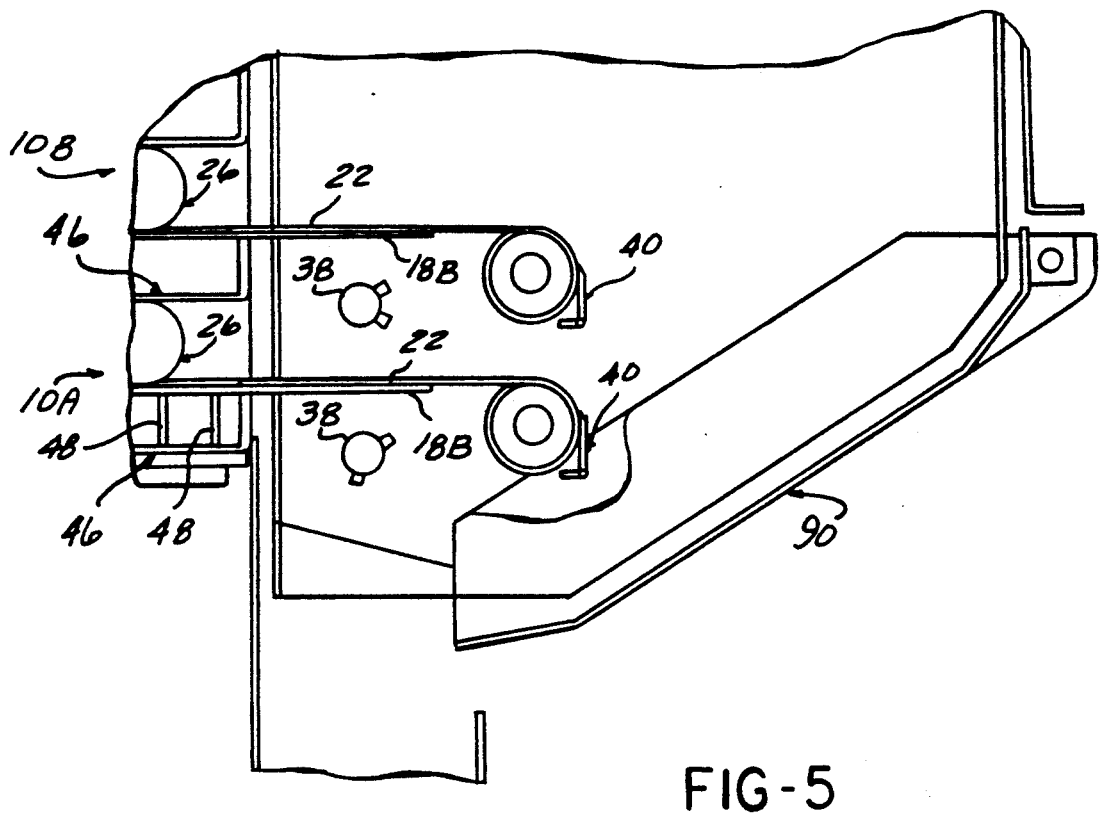
FIG. 5 is a fragmentary front elevational view in partial section of the corner of the filter unit and associated filter belt arrangement components shown in FIG. 3, showing a plurality of filter units in a vertical
Figure 6:
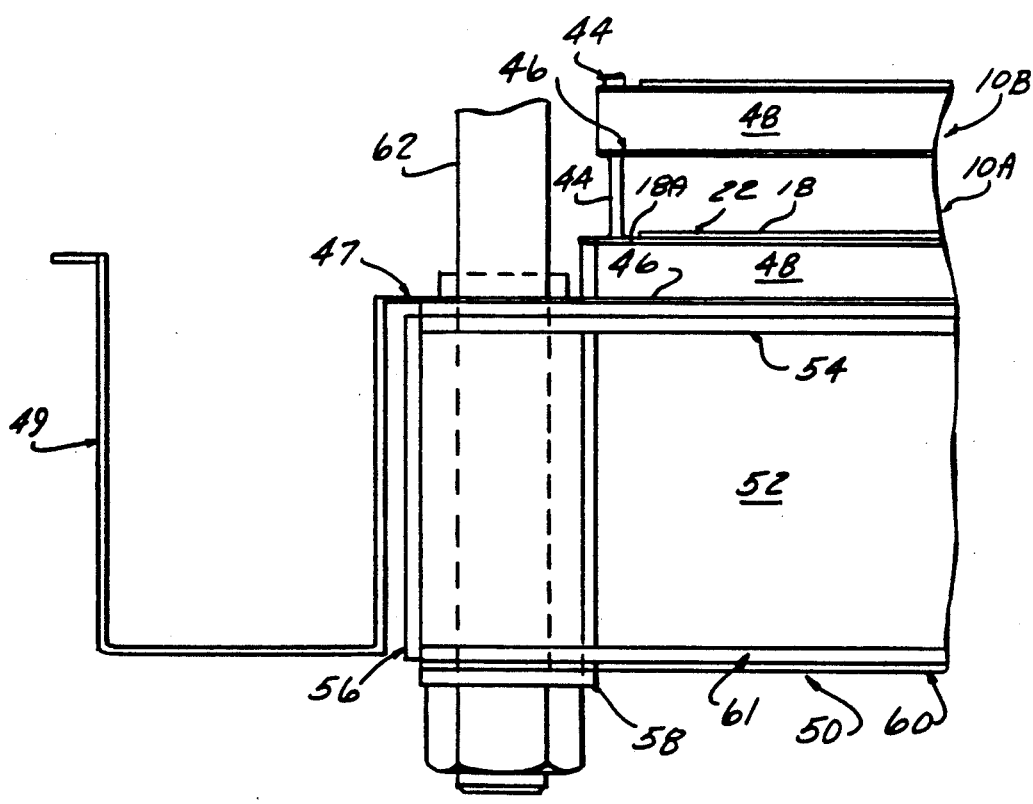
FIG. 6 is a fragmentary side elevational view of the filter unit corner shown in FIGS. 3 and 4, showing a plurality of vertically stacked filter units.

As seen in FIG. 5, the support plate 18 is itself supported by a series of spaced apart parallel bars 48 extending from side to side beneath the support plate 18 and above the floor pan 46. The spaces between the bars 48 define the collection chamber 20 which open out over a side surface 47 defined by the projecting lowermost floor pan 46, which extends to a collection trough 49, repeated on the other side, receiving the filter liquid for recirculation to the utilizing system.

The lowermost filter unit 10A is supported on a heavy lower frame 50 made up of a weldment of I-beams 52 and plates 54, 56, 58, 60 and series of large diameter tie bolts 62 pass through the lower frame 50 and to an similar upper frame (not shown). This construction resists the large unbalanced forces created by the internal pressures in filter chambers 14. These pressures are balanced for the most part except at the top and bottom, but if there are large filter areas, the forces are considerable and require a heavy frame to resist.

A vertical manifold pipe 65 for the washing jets 38 is mounted between each roller 28, 30 and the housing 12 (FIG. 4). The support plate 18 has a portion 18B which projects out of the housing 12 to partially span the gap and provide a support for the filter belt 22 so as to prevent sagging when heavily loaded with filter cake.

The rollers 28, 30 are mounted spaced from the housing 12. The right hand roller 30 is shown in FIG. 4, having a reduced diameter end 63 supported in a bearing sleeve 68.

Bearing sleeve 64 is welded to a side member 66 supported on posts 68 by brackets 70.

Figure 8:
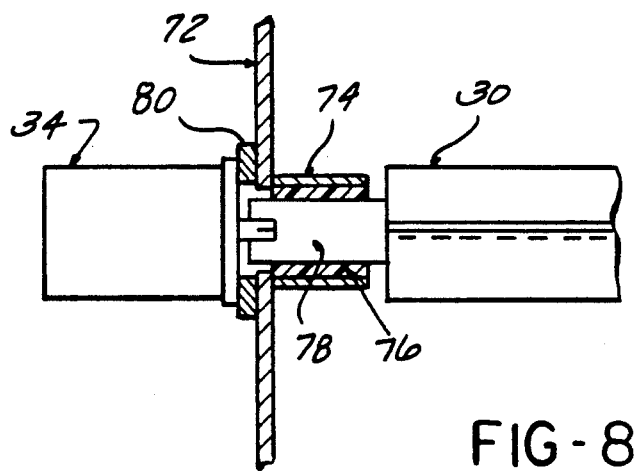
FIG. 8 is an enlarged detail sectional view of a drive motor and one end of a drive-take up roller.
Figure 9:
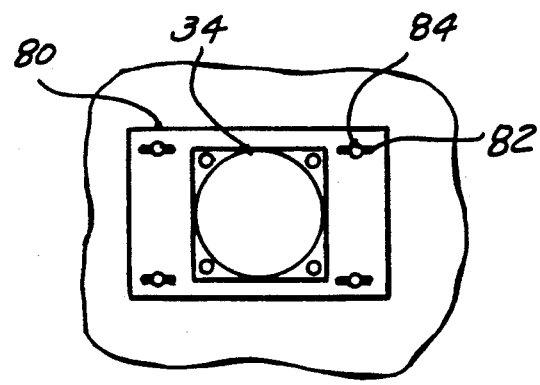
FIG. 9 is an end view of the drive motor shown in FIG. 7.

A similar construction on the other end of the rollers 28, 30, is shown in FIGS. 8 and 9, in which a side member 72 supports a bearing housing sleeve 74 mounting a bearing 76 receiving a reduced end 78 of the roller 30.

Hydraulic drive motor 34 is mounted to the member 74 and has output keyed to the roller end 78 to establish a rotary connection.

An adjustment plate 80 may be mounted with elongated holes 82 and bolts 84 to allow alignment of the rollers 28, 30 for accurate tracking of the filter belt 22.

Figure 7:
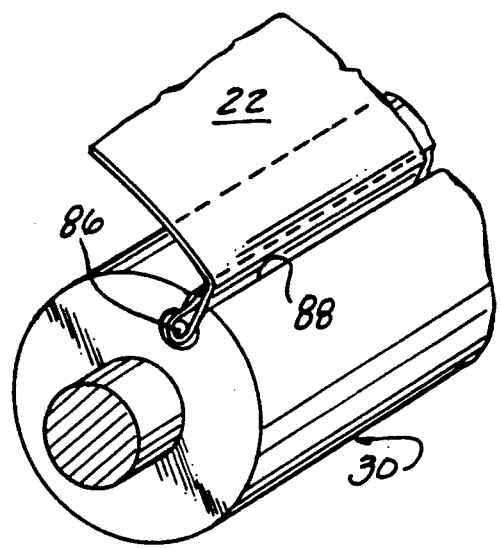
FIG. 7 is an end view of a drive-take up roller with one end of the filter belt installed therein.

The presence of the side members 66, 72 limits lateral access to the rollers 28, 30. A special attachment shown in FIG. 7 is utilized for attaching either end of the filter belt 22 to a respective roller 28, 30 which allows ready replacement without the use of separable hardware items or dismantling of the filter. This attachment means comprises an elongated flexible element 86 such as a length of small diameter round neoprene shape which is sewn into a pocket at each end of the filter belt 22. Each roller 28, 30 is formed with an undercut slot 88 extending the length thereof and sized to receive the filter belt end with the sewn in flexible element 86 so as to be securely retained therein. The belt may be advanced into the slot 88 from the side, the belt being able to be guided around the side members 66, 72 as necessary so that no dismantling is required.

As shown in FIG. 5, a swinging deflector chute 90 may be positioned co wash liquid during washing in trough 49 for recirculation for reuse in the utilizing systems and then swing away to allow filter cake to drop into a conveyor (not shown) during scraping of the belt.

The back and forth motion of the filter belt has been found to eliminate mistracking problems. The use of two sections alternately increases the filter belt life, which is further enhanced by elimination of any rubbing of overlapped filter sections against each other. The cycle time is reduced by the immediate positioning of a fresh section in the chamber as a loaded section is advanced out of the filter chamber.

The rollers 28, 30 can be constructed of standard shafting stock, which is quite precisely sized so that accurate windup and drive rollers can be fabricated at relatively low cost.

The attachment means allows easy and rapid replacement of the filter belt without separate hardware items to minimize downtime.

Rather than only two sections alternately positioned in the housing, additional sections could be employed by winding up sufficient additional lengths of filter belts, with suitable controls to correctly position each separate section in the housing.

I claim
1. A filter for a liquid comprising:
a filter housing;
a filter chamber defined within said filter housing;
inlet means for directing a liquid to be filtered into said filter chamber;
an elongate opening at each of opposite sides of said housing entering into said filter chamber, said elongate openings being substantially parallel to one another;
an elongate inflatable seal within each said elongate opening and extending across said elongate opening;
control means for inflating said inflatable seals preparatory to a filter cycle;
a support plate mounted in said housing extending across said filter chamber, said support plate having pattern of through openings, said support plate having an inlet side facing said inlet means and an outlet side opposite said inlet side, the inlet side of said support plate and elongate openings being substantially aligned in a common plane;
a flow collection chamber in said housing disposed adjacent said outlet side of said support plate;
outlet means for directing filtered liquid in said flow collection chamber out of said filter to a utilizing system;
a filter belt extending into one of said elongate openings, across said support plate to cover said through openings, and out of the other of said elongate openings, said filter belt having a pair of opposed ends;
a first roller disposed outside said housing parallel to and opposite to one of said elongate openings to be substantially adjacent to said common plane, and a second roller disposed outside said housing parallel and opposite the other of said elongate openings to be substantially adjacent to said common plane;
first attachment means for attaching one of said ends of said filter belt to said first roller;
second attachment means for attaching the other of said ends of said filter belt to said second roller means;
said filter belt being of a predetermined fixed length sufficient to enable different sections along the length thereof to be alternately disposed in said housing while the other section is wound up on one of said first or second rollers;
filter belt scraper means positioned adjacent an outwardly facing surface of a portion of said filter belt wound upon each of said first and second rollers to remove accumulated solids from the surface of said filter belt as said respective sections are wound up on said first or second roller respectively; and, drive means for alternately rotating one of said first and second rollers in opposite directions while the other is idled;

said control means including means for deflating said seals, and means for controlling said drive means upon deflation of said seals to enable alternative wind up of one or another section of said filter belt on said first or second roller respectively while the other of said filter belt sections is moved into said housing prior to said filter cycle.

2. The filter according to claim 1 wherein said drive means includes a revolution counter associated with one of said first or second rollers and wherein said control means responsive to said revolution counter to control said drive means to position one or the other section in said housing.

3. The filter according to claim 1 wherein said drive means includes a hydraulic motor connected at one end to each of said rollers to enable rotation thereof.

4. The filter according to claim 1 wherein said filter belt is provided with border strips extending along either side of said filter belt extending in the direction of movement of said filter belt caused by wind up on said first or second rollers, said strips treated to be impervious to fluid flow therethrough, and wherein said support plate has solid border regions extending in said direction of movement of said filter belt and overlain by said treated edges of said filter belt to be sealed thereagainst upon pressurization of said filter chamber with said liquid to be filtered.

5. The filter according to claim 4 wherein said filter belt treated border strips are impregnated with plastic.

6. The filter according to claim 5 wherein each said attachment means comprises a flexible elongated element sewn into each said end of each said filter belt, and further including an undercut slot extending the length of each of said first and second rollers receiving said end with said flexible elongate element, whereby said belt ends may be installed by being advanced into said slot from a side thereof with said first and second rollers mounted to allow only limited side clearance by bending the flexible elongated element.

7. The filter according to claim 1 wherein said support plate projects out of said housing through both of said elongate openings and extends to a point adjacent both of said fist and second rollers to provide support for said filter belt.

8. The filter according to claim 1 further including means for directing washing spray jets at either of said filter belt sections, and control means activating said spray jets as either of said filter belt sections is advanced back into said housing preparatory to another filter cycle.

9. The filter according to claim 1 wherein a plurality of filter units are stacked vertically, each until having an associated respective said filter belt and first and second roller sets.

* * * * *